(12) United States Patent
Margulis

(10) Patent No.: US 6,690,379 B2
(45) Date of Patent: Feb. 10, 2004

(54) COMPUTER SYSTEM CONTROLLER HAVING INTERNAL MEMORY AND EXTERNAL MEMORY CONTROL

(75) Inventor: Neal Margulis, Woodside, CA (US)

(73) Assignee: Memtrax LLC, Woodside, CA (US)

( * ) Notice: Subject to any disclaimer, the term of this patent is extended or adjusted under 35 U.S.C. 154(b) by 0 days.

(21) Appl. No.: 10/042,751

(22) Filed: Nov. 21, 2002

(65) Prior Publication Data

US 2003/0103056 A1 Jun. 5, 2003

Related U.S. Application Data

(63) Continuation of application No. 09/541,413, filed on Mar. 31, 2000, now abandoned, which is a continuation of application No. 08/926,666, filed on Sep. 9, 1997, now Pat. No. 6,118,462, which is a continuation-in-part of application No. 08/886,237, filed on Jul. 1, 1997, now Pat. No. 6,057,862.

(51) Int. Cl.[7] ............................................. G06F 13/18
(52) U.S. Cl. ....................... 345/535; 345/531; 345/536; 345/542
(58) Field of Search ................................ 345/501, 503, 345/520, 531, 532, 535, 536, 541, 542, 543, 545

(56) References Cited

U.S. PATENT DOCUMENTS

| 5,544,306 | A | 8/1996 | Deering et al. |
| 5,572,655 | A | 11/1996 | Tuljapurkar et al. |
| 5,790,110 | A | 8/1998 | Baker et al. |
| 5,790,138 | A | 8/1998 | Hsu |
| 5,815,167 | A | 9/1998 | Muthal et al. |
| 5,936,635 | A | 8/1999 | Larson et al. |
| 6,041,010 | A | 3/2000 | Puar et al. |
| 6,041,400 | A | 3/2000 | Ozcelik et al. |
| 6,076,139 | A | 6/2000 | Welker et al. |
| 6,081,279 | A | 6/2000 | Reddy |
| 6,101,584 | A | 8/2000 | Satou et al. |
| 6,104,417 | A | 8/2000 | Nielsen et al. |
| 6,108,015 | A | 8/2000 | Cross |
| 6,167,486 | A | 12/2000 | Lee et al. |
| 6,173,381 | B1 | 1/2001 | Dye |
| 6,215,497 | B1 | 4/2001 | Leung |
| 6,232,990 | B1 | 5/2001 | Poirion |
| 6,240,437 | B1 | 5/2001 | Guttag et al. |
| 6,247,084 | B1 | 6/2001 | Apostol et al. |
| 6,295,074 | B1 | 9/2001 | Yamagishi et al. |

*Primary Examiner*—Ulka J. Chauhan
(74) *Attorney, Agent, or Firm*—Wells St. John, P.S.

(57) ABSTRACT

The present invention relates generally to an optimized memory architecture for computer systems and, more particularly, to integrated circuits that implement a memory subsystem that is comprised of internal memory and control for external memory. The invention includes one or more shared high-bandwidth memory subsystems, each coupled over a plurality of buses to a display subsystem, a central processing unit (CPU) subsystem, input/output (I/O) buses and other controllers. Additional buffers and multiplexers are used for the subsystems to further optimize system performance.

12 Claims, 12 Drawing Sheets

COMPUTER SYSTEM CONTROLLER HAVING INTERNAL MEMORY AND EXTERNAL MEMORY CONTROL

RELATED APPLICATIONS

This patent application is a continuation application of U.S. patent application Ser. No. 09/541,413, filed on Mar. 31, 2000 now abandoned entitled "Computer System Controller Having Internal Memory and External Memory Control," naming Neal Margulis as inventor, which is a continuation application of U.S. patent application Ser. No. 08/926,666, filed on Sep. 9,1997, now U.S. Pat. No. 6,118, 462, which resulted from a continuation-in-part application of U.S. patent application Ser. No. 08/886,237, filed on Jul. 1, 1997, entitled "Computer System Having a Common Display Memory and Main Memory," naming Neal Margulis as inventor, now U.S. Pat. No. 6,057,862, the disclosures of which are incorporated by reference.

BACKGROUND OF THE INVENTION

1. Field of the Invention

The present invention relates generally to a memory architecture for computer systems and more particularly to a memory subsystem comprised of internal memory and control for external memory.

2. Discussion of Prior Art

A typical personal computer system has a central processing unit (CPU) with an external main memory and has a graphics display subsystem with its own memory subsystem. Part of this memory subsystem is a frame buffer that provides the output to the display, and part of this subsystem may be used for off-screen operations. However, the graphics display subsystem memory and the main system's pool of memory do not share data efficiently or move data efficiently from one memory subsystem to the other.

Another typical personal computer system has a single memory subsystem for both the CPU and the graphics subsystem. The performance of this type of computer system is lower than that of computer systems that have separate memory subsystems for the graphics display subsystem and for the CPU. Even though these single external memory systems can support a cache memory for the CPU, their overall performance is still lower because the memory bandwidth is shared between the graphics and CPU subsystems. These computer systems are very limited in their ability to achieve good performance for both the CPU and graphics subsystems. In order to be cost effective, these systems typically use a lower cost main memory that is not optimized for the special performance needs of graphics operations.

For systems that use a single external memory subsystem to perform all of their display refresh and drawing operations, performance is compromised by the memory bandwidth for these operations being shared with the memory bandwidth for the CPU. "Refresh" is the general term for taking the information contained in a frame buffer memory and sequentially transferring the information by rows to a palette digital-to-analog converter (DAC) to be displayed on an output device such as a monitor, TV or flat panel display. The frame buffer's entire contents needs to be transferred to the output device continuously for the displayed image to be visible. In the case of a monitor, this refresh is performed typically between 75 and 95 times per second. For high-resolution color systems, the refresh process consumes an appreciable portion of the total bandwidth available from the memory.

In addition to the refresh bandwidth, the graphics subsystem performs drawing operations that also consume an appreciable amount of bandwidth. In the case of 2-D graphics acceleration the drawing operations include Bit-BLt (Bit Block Transfers), line drawing and other operations that use the same common pool of memory.

Intel and other companies in the PC industry have designed an advanced peripheral port (AGP) bus and an associated system architecture for combining graphics and chipsets. AGP is a second private bus between the main memory controller chipset and the graphics display subsystems. AGP and the associated system architecture allow the storage of 3-D texture memory in the main memory that can be accessed by the graphics subsystem. This is one limited use of shared main memory for a graphics function. However, because there is a single bus between the graphics subsystem and the main memory controller chipset, this bus limits the system performance. This single bus is shared by all CPU commands to the graphics controller, any CPU direct reads or writes of display data, all texture fetches from main memory and any other transfers of display information that is generated or received from the CPU or I/O subsystems (i.e. video data from a capture chip or a decoder).

AGP is designed to overcome the above-described performance limitations from using the main memory subsystem for display refresh and drawing operations. AGP systems overcome these limitations by a brute force requirement that the graphics subsystem on the AGP bus have a separate frame buffer memory subsystem for screen refresh and drawing operations. Using frame buffer memory is a good solution for eliminating the performance penalties associated with drawing and refresh operations. Meanwhile, as a frame buffer is always required, AGP systems do not allow for screen refresh to be performed from the main system memory. This does not allow the optimization of refreshing all or part of the screen from main memory.

Additionally, the drawing operations must be performed in the graphics display memory and are therefore performed by the graphics subsystem controller. Also limiting the dedicated frame buffer system flexibility, the graphics subsystem controller can not efficiently draw into the main system memory.

Separating the frame buffer memory from the main system memory duplicates the input/output (I/O) system data. For example, this occurs in a system where video data enters the system over an I/O bus through a system controller and then is stored in the main system memory. If the data is displayed, it needs to be copied into the frame buffer. This creates a second copy of the data, transfer of which requires additional bandwidth.

Another alternative is to have a peripheral bus associated with the graphics controller where the I/O data is transferred to the frame buffer. While this allows display of the data without additional transfers over a system bus, the data remains local to the display subsystem. The CPU or main I/O systems can not access the data without using a system bus. For systems with a shared memory subsystem, the I/O data enters a shared memory region. It is then available to either the display subsystem or the CPU.

FIG. 1 shows a diagram of a standard, prior art memory architecture 100. A CPU subsystem 102 is connected to a subsystem 104 which is connected to an external system Random Access Memory (RAM) 110 and to a peripheral component interface (PCI) bus 112. Subsystem 104 contains a system controller 106 and a graphics controller 108 that is connected to a display (not shown in FIG. 1). The system has a single external memory subsystem 110 for both the graphics display and CPU 102.

FIG. 2 is a diagram of the current state-of-the art personal computer memory architecture 200 having separate memories for the CPU and for the graphics display. A CPU subsystem 204 is connected to a system controller 206 that is connected to an external system RAM 210 and to a PCI bus 216. System controller 206 is also connected through a dedicated AGP bus 214 to a graphics controller 208 that is connected to a graphics RAM 212, which is external or integrated with the controller, and to a display 202. CPU subsystem 204 can not treat graphics RAM 212 as an extension of system RAM 210, and graphics subsystem 208 can not use system memory 210 for display refresh.

What is needed is an integrated system controller that supports a memory architecture which combines internal and external memory in which common memory can be used for display memory and main memory, without having inadequate bandwidth access to the common memory to impair performance.

SUMMARY OF THE INVENTION

The present invention resides in a memory architecture having one or more high bandwidth memory subsystems where some of the memory subsystems are external to the controller and some of the memory subsystems are internal. Each of the high bandwidth memory subsystems is shared and connected over a plurality of buses to a display subsystem, a central processing unit (CPU) subsystem, input/output (I/O) buses and other controllers. A display subsystem is configured to receive various video and graphics type data from the high-speed memory subsystems and to process it for display refresh. Additional buffers and caches are used for the subsystems to optimize system performance. The display refresh path includes processing of the data from the memory subsystem for output to the display, where the data enters the shared memory subsystems from an I/O subsystem, from the CPU subsystem or from the graphics subsystem.

DETAILED DESCRIPTION OF THE PREFERRED EMBODIMENTS

The present invention resides in a memory architecture having one or more shared high-bandwidth memory subsystems that are both internal and external to the system controller. Each of the high-bandwidth memory subsystems is connected over a plurality of buses to the display subsystem, the central processing unit (CPU) subsystem, the input/output (I/O) buses and other controllers. The display subsystem is configured to receive various video and graphics data types for processing and display refresh from the high-speed shared memory. Additional buffers and caches are used for the subsystems to optimize the system.

Figure 1:
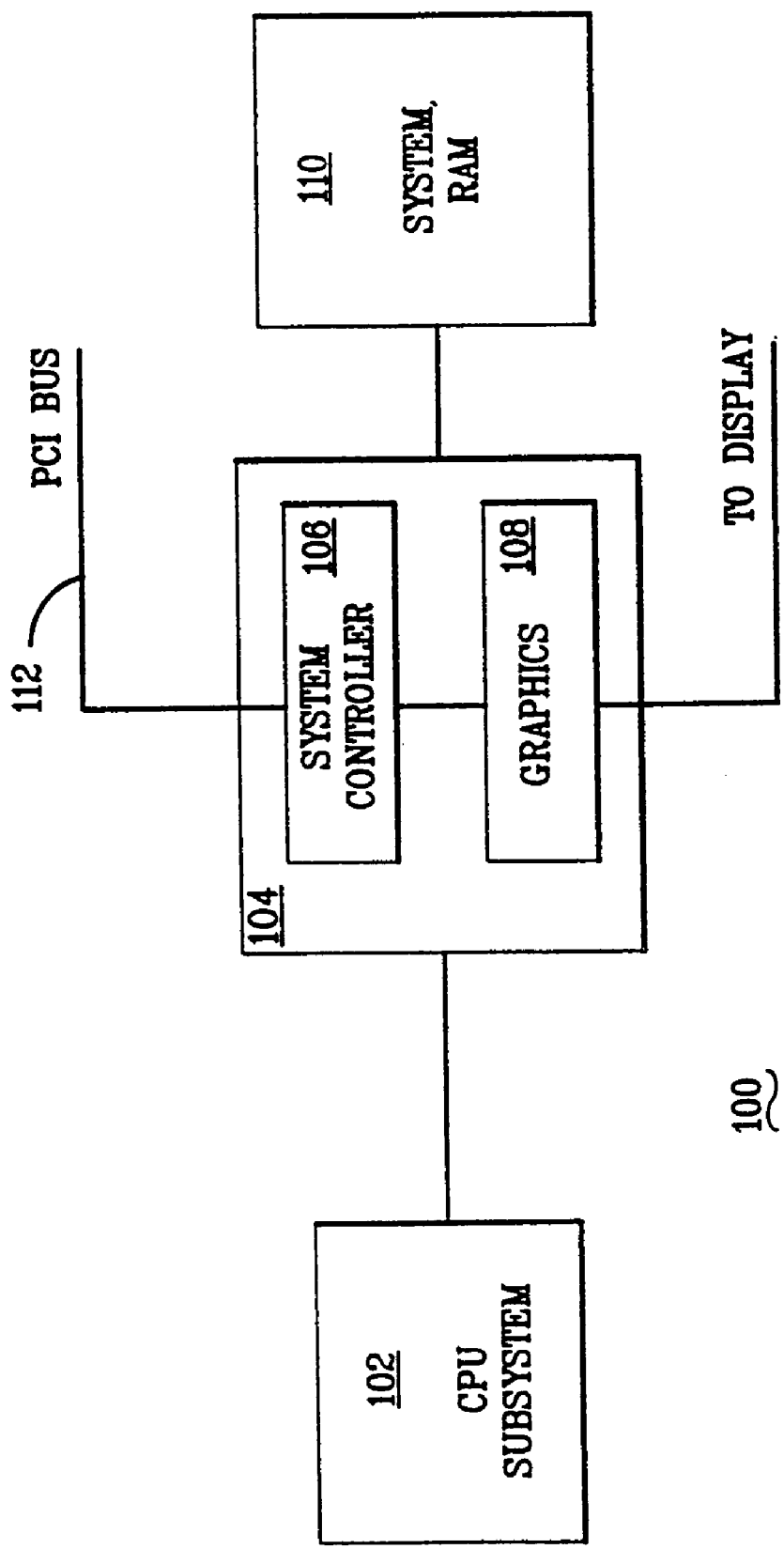
FIG. 1 is a diagram of a prior art memory architecture for a computer system.
Figure 2:
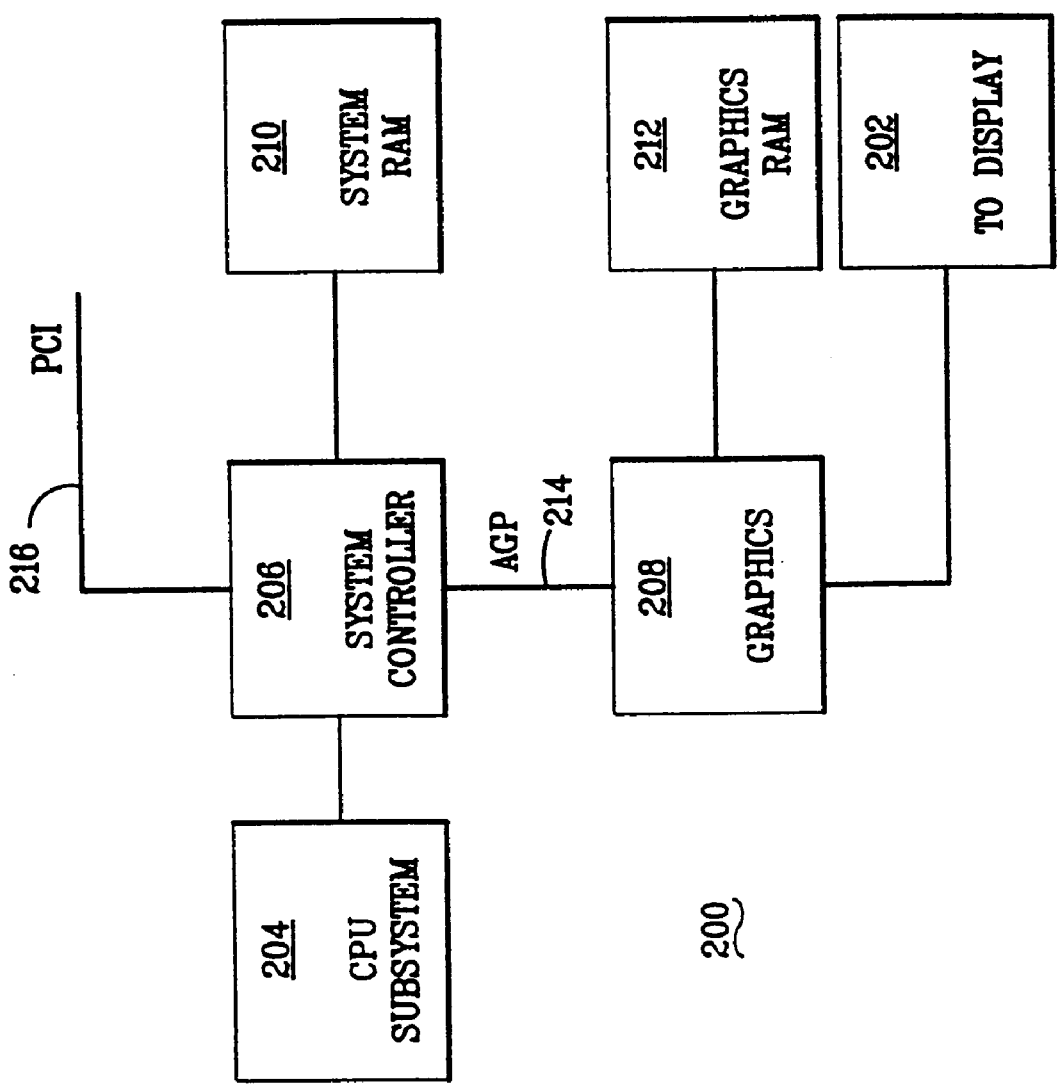
FIG. 2 is a diagram of another prior art memory architecture for a computer system.
Figure 3:
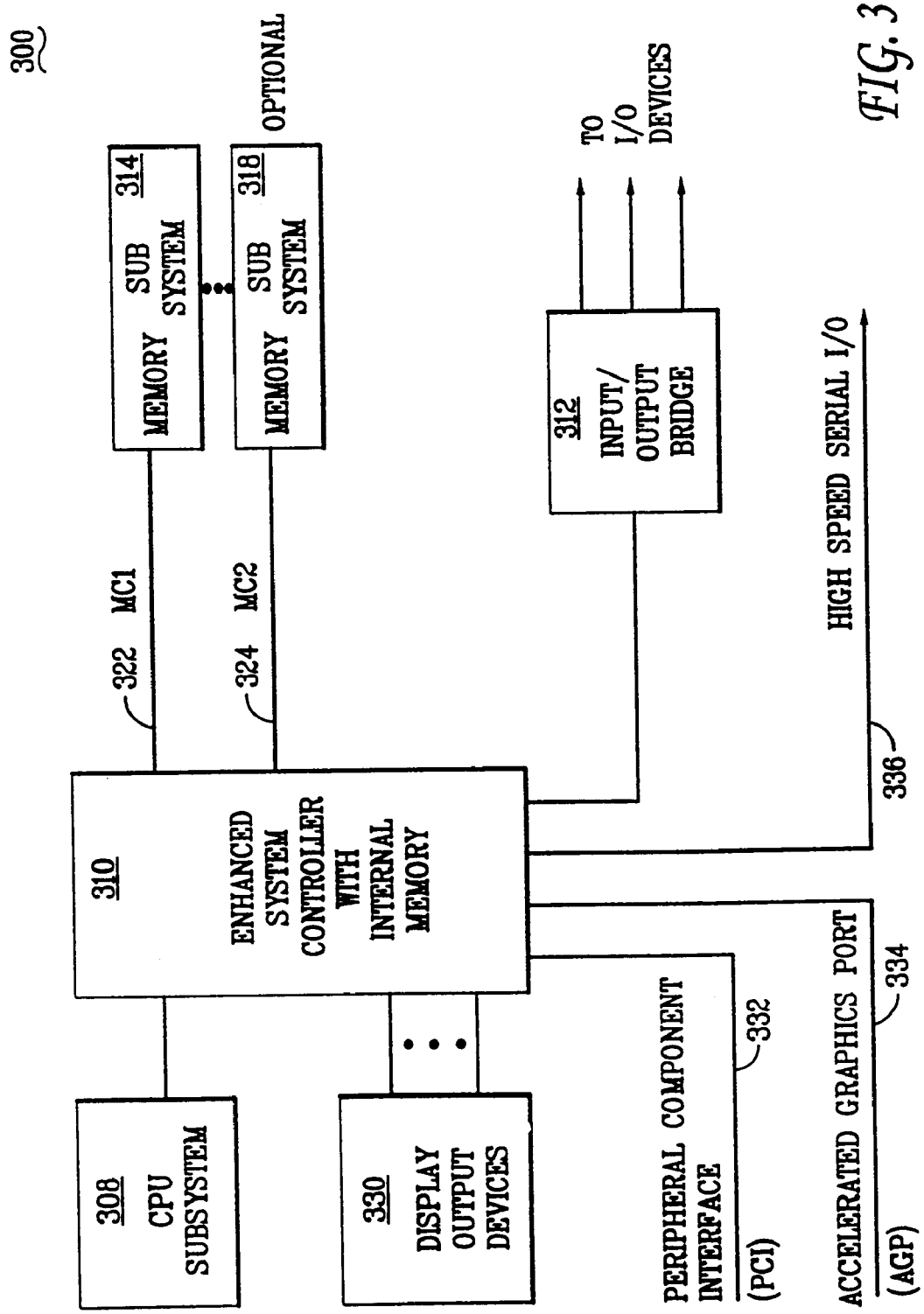
FIG. 3 is a diagram of an embodiment of a computer system having a common display memory and main memory of integrated and external memory.

FIG. 3 shows a system block diagram 300 of an embodiment of the present invention, including a CPU subsystem 308 connected to an enhanced system controller 310 which is in turn connected through memory channel EMC1 322 to a memory subsystem 314 and through memory channel EMC2 324 to a memory subsystem 316. Each memory channel includes independent controls and contains multiple banks of memory. Enhanced system controller 310 is also connected to an input/output bridge 312, display output devices 330, a PCI bus 332, an advanced peripheral port (AGP) 334, and a high-speed serial I/O port 336. Integrated into the enhanced system controller are additional internal memory subsystems, each with their own control and data channels.

A low cost multimedia personal computer system is achieved by optimizing a system with respect to memory bandwidth to share one or more common memory subsystems for aspects of display memory and main system memory. The FIG. 3 common memory subsystem allows sharing the available bandwidth as well as sharing the pool of memory. The shared memory subsystem bandwidth can be allocated either to display operations or the primary CPU and main I/O system. The common pool of memory is allocated, depending on the application and operating system, to support display memory such as textures or buffers. Alternatively, the common pool of memory can be allocated to the rest of the system to support CPU code, data or peripheral system swap areas for I/O devices in the system. Additionally, the common pools of memory, either internal or external, can be dynamically shared with common data used by both the display subsystem and the other system functions.

Figure 4:
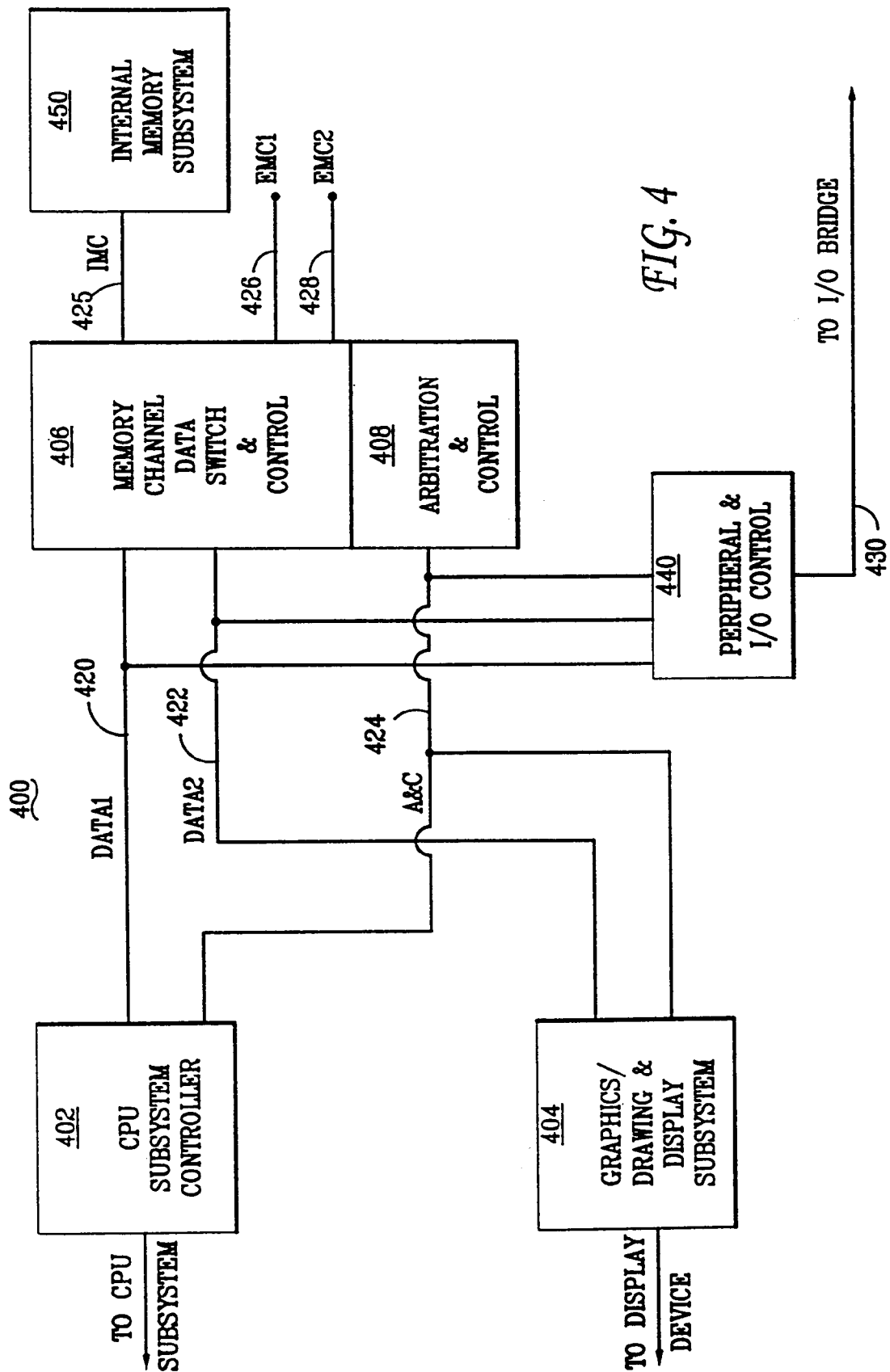
FIG. 4 is a diagram of an embodiment of the system with a common display memory and main memory.

FIG. 4 shows a system block diagram 400 of an embodiment of the present invention, including a CPU subsystem controller 402 connected to a graphic/drawing and display subsystem 404, a memory channel data switch and control unit 406, an arbitration and control unit 408 and a peripheral I/O control unit 440. CPU subsystem controller 402 is also connected to a CPU subsystem (not shown). Graphic/drawing and display subsystem 404 is connected to a display device (not shown), the memory channel data switch and control unit 406 and the arbitration and control unit 408. The memory channel data switch and control unit 406 is also connected to memory channels MC1 426 and MC2 428 (not shown). The peripheral I/O control unit 410 is also connected to an I/O bridge 430 (not shown).

There are two data buses in the FIG. 4 implementation. One data bus (DATA1) 420 is primarily used by the CPU subsystem for accessing the common memory. A second data bus (DATA2) 422 is primarily used by the graphics drawing and display subsystem 404. Having two data buses allows concurrent accesses of memory by the CPU controller 402 and by graphics drawing and display subsystem 404. Peripheral and I/O controller 440 shares the data bus of either CPU controller 402 or graphics drawing and display subsystem 404.

This implementation shows a shared address and control (A&C) bus 424. Arbitration and control unit 408 is responsible for responding to requests from CPU subsystem controller 402, graphics drawing and display subsystem 404 and peripheral and I/O control unit 440, and scheduling their memory accesses. Arbitration and control unit 408 includes a set of configuration and state registers (not shown) that processes requests intelligently. Additionally, the request protocol specifies the amount of data required by the requester. Arbitration and control unit 408 processes the requests with the objectives of maximizing concurrency of the two data buses, optimizing for the length of the transfers and assuring that the latency for requests does not compromise system performance.

To meet these conflicting objectives, arbitration and control unit 408 tracks the state of the memory channels as well as the latency of the requests. Arbitration and control unit 408 breaks a single request from a subsystem into multiple requests to the memory channels. By doing this, the latency and memory bursts are optimized. Also, the requesting subsystems request very long bursts of data without concern for unbalancing the system throughput and without having to reuse the A&C bus 424.

Figure 5:
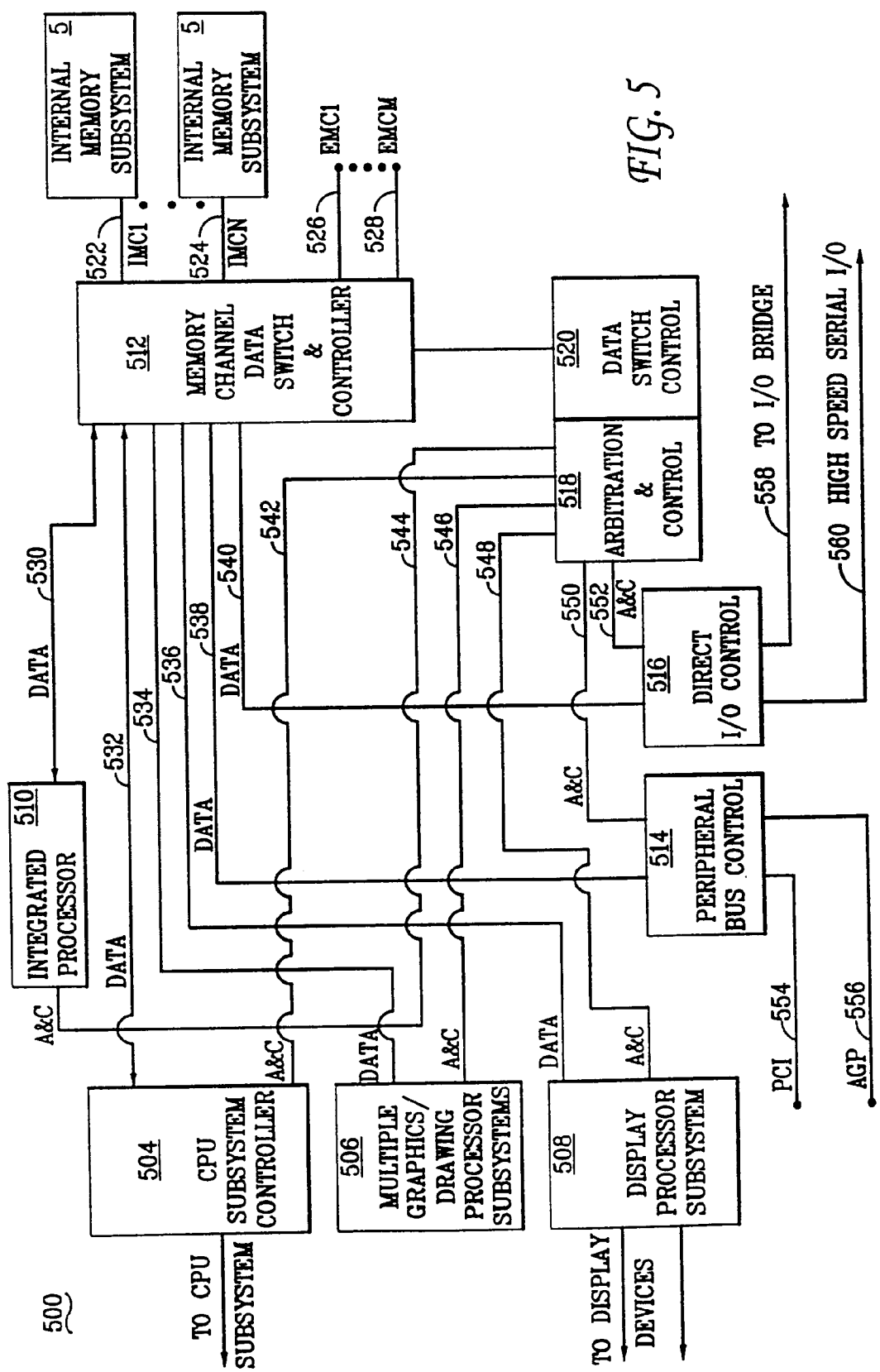
FIG. 5 is a diagram of a full-function embodiment of the new enhanced system with a common display memory and main memory.

FIG. 5 shows a system block diagram 500 of an embodiment of an enhanced CPU subsystem controller 504 connected by with a data bus 532 to a memory channel data switch and controller 512 and connected by a control bus 542 to an arbitration and control unit 518. System 500 also includes a graphic/drawing processor subsystem 506 connected by a data bus 534 connected to memory channel data switch and controller 512 and connected by a control bus 546 to arbitration and control block 518. System 500 also includes a display processor subsystem 508 connected by a data bus 536 to the memory channel data switch and controller 512 and with a control bus 548 connected to the arbitration and control unit 518. FIG. 5 also shows the memory channel data switch and controller 512 is connected to an integrated processor 510 by a data bus 530, connected to a peripheral bus control unit 514 by data bus 538, connected to a direct I/O control unit 516 by a data bus 540 and the data switch control unit 520. Memory channel data switch and controller 512 has outputs for internal memory channels IMC1 522 through IMCN 524 and external memory channels EMC1 526 through EMCM 528.

FIG. 5 shows the peripheral bus control unit 514 is connected by control bus 550 to the arbitration and control unit 518 and connected to two buses PCI 554 and AGP 556. The direct I/O control unit 516 is connected by control bus 552 to the arbitration and control unit 518 and connected to an I/O bridge 558 and a high-speed serial I/O port 560. FIG. 5 shows the integrated processor 510 is connected by control bus 544 to the arbitration and control unit 518.

FIG. 5 shows a more extensive implementation 500 of the base system 400 described in FIG. 4. System 500 includes more potentially concurrent data buses, additional A&C buses and additional requester subsystems such as the integrated processor 510. Note that the graphics drawing and display processor is broken into two requester subsystems, the graphics drawing processor subsystem 506 and the display processor subsystem 508, each with their own paths to memory channel data switch and controller unit 512 and to arbitration and control unit 518. The multiple graphics drawing processor subsystems 506 are broken up to each support multiple data paths in a more elaborate system. The display processor subsystem 508 also includes a separate data path.

The integrated processor 510 included in FIG. 5 performs any number of functions. Examples include a geometry and lighting engine for 3-D graphics, an MPEG-2 decoder, an audio processor or some type of audio or video compression engine. Any of these subsystems would include a processor and local memory. A hierarchical memory structure is also possible as an implementation of the system of FIG. 5 where a separate memory channel data switch including IRAM subsystems can be more closely linked with the multiple graphics/drawing processor subsystems and the display processor subsystem.

Figure 6:
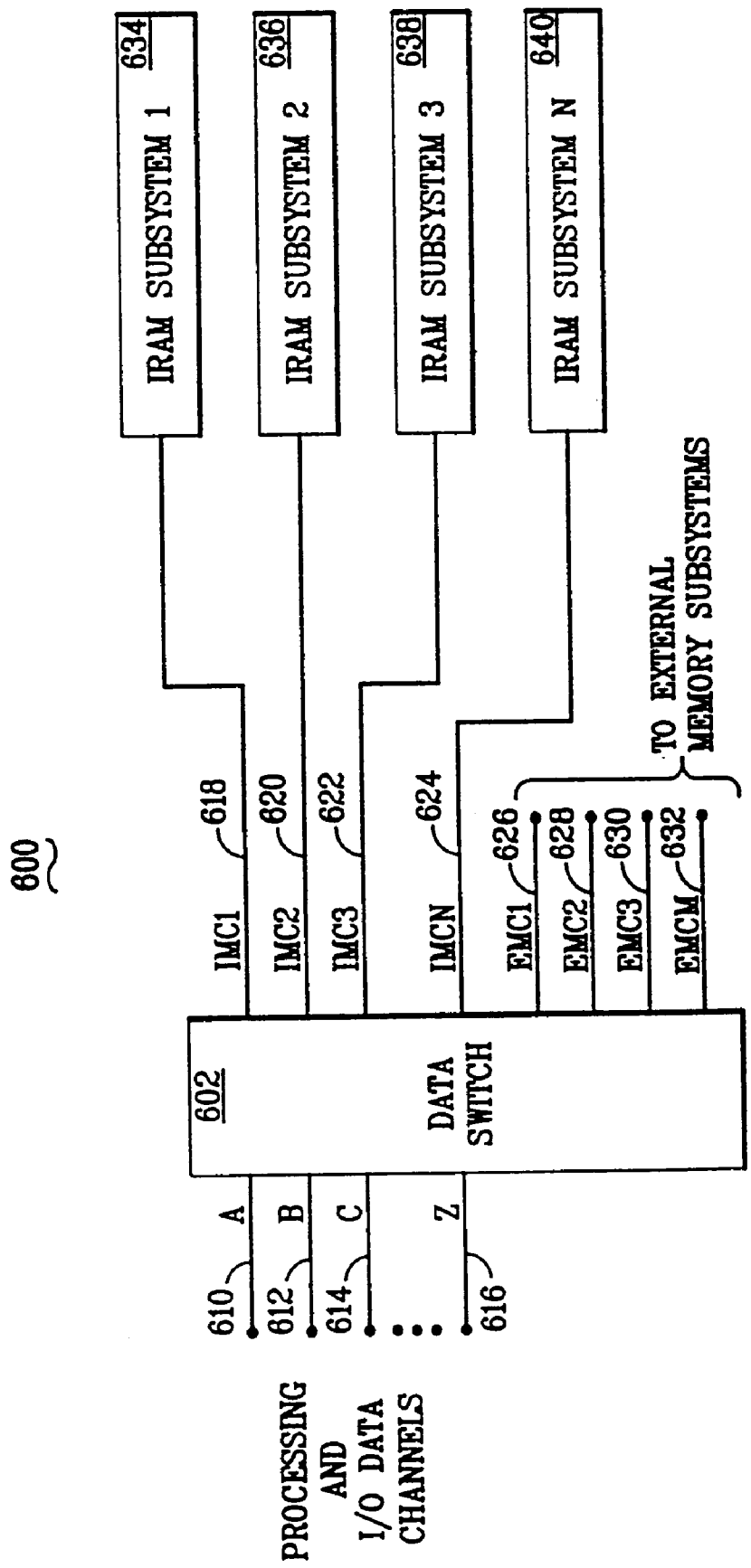
FIG. 6 is a diagram of an embodiment of a data switch with both internal and external memory channels.

FIG. 6 shows a diagram of an embodiment of a data switch 600 that connects the subsystem channels A–Z with the memory channels (MC). There are N internal memory subsystems (IRAM subsystem 1 through IRAM subsystem N) with respective control and data buses (internal memory channels) labeled IMC1 through IMCN. Additionally, there are M external memory subsystem buses (external memory channels) shown labeled EMC1 through EMCM. Each MC is independent as far as the control and data path structure. The data switch 600 allows the subsystem data channels A–Z to concurrently access some number of the memory channels MC.

Figure 7:
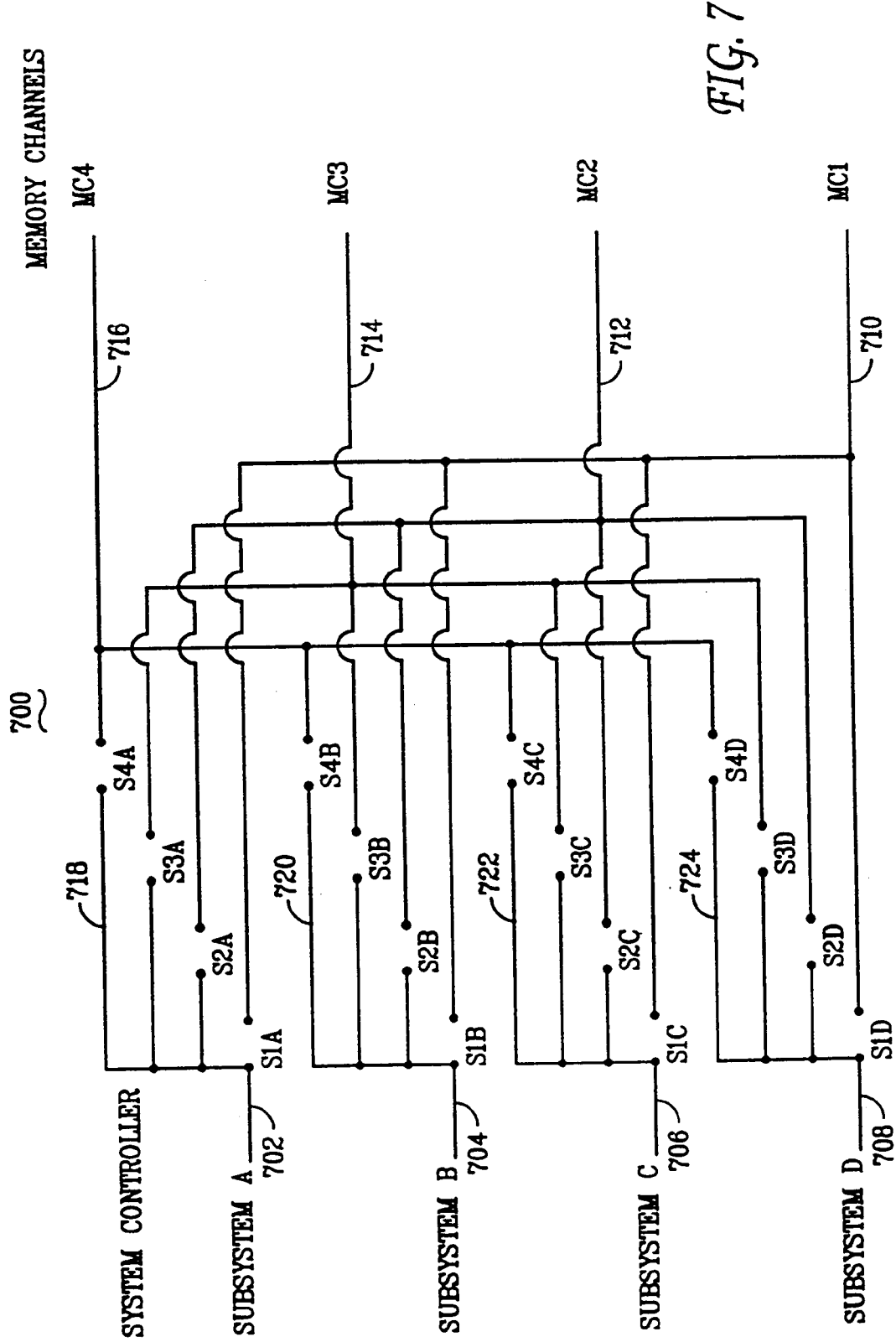
FIG. 7 is a diagram of an embodiment of a 4×4 crossbar data switch.

FIG. 7 shows a diagram of an embodiment of a 4×4 crossbar data switch 700. The system controller outputs for subsystem A 702, B 704, C 706 and D 708 can be routed selectively by means of switches SNA 718, SNB 720, SNC 722 and SND 724 to memory channels MC1 710, MC2 712, MC3 714 and MC4 716, where N can be 1, 2, 3, or 4. While the actual configuration of the switch varies in the implementation, FIG. 7 shows the complete capabilities for four subsystem controllers and four memory channels. The crossbar data switch 700 allows four separate data paths to be concurrent through the switch. When any one controller is utilizing one of the memory channels, the other controllers are not blocked from accessing the other three memory controllers.

A crossbar switch can be designed to be bi-directional or unidirectional. In the case of unidirectional switches, both a set of read switches and a set of write switches may be needed. Not all switches in a system need to be as complex as a crossbar switch. Much simpler switches and MUX based switches can be used and still achieve good overall performance. In the simplest case, a switch may be a connection point between a subsystem channel and a memory channel. A simpler switch architecture is particularly useful for the multi-bank and multiple row buffer configurations shown later in FIG. 9 and 10 respectively.

For example, if subsystem A is accessing channel MC3, the switch labeled S3A is active. Concurrently, subsystem B may be accessing channel MC4 with switch S4B closed, and subsystem C may access channel MC1 with switch S1C, while subsystem D accesses channel MC2 through switch S2D. If a subsystem needs to connect to a memory channel that is in use by another subsystem, it is blocked and must wait.

Figure 8:
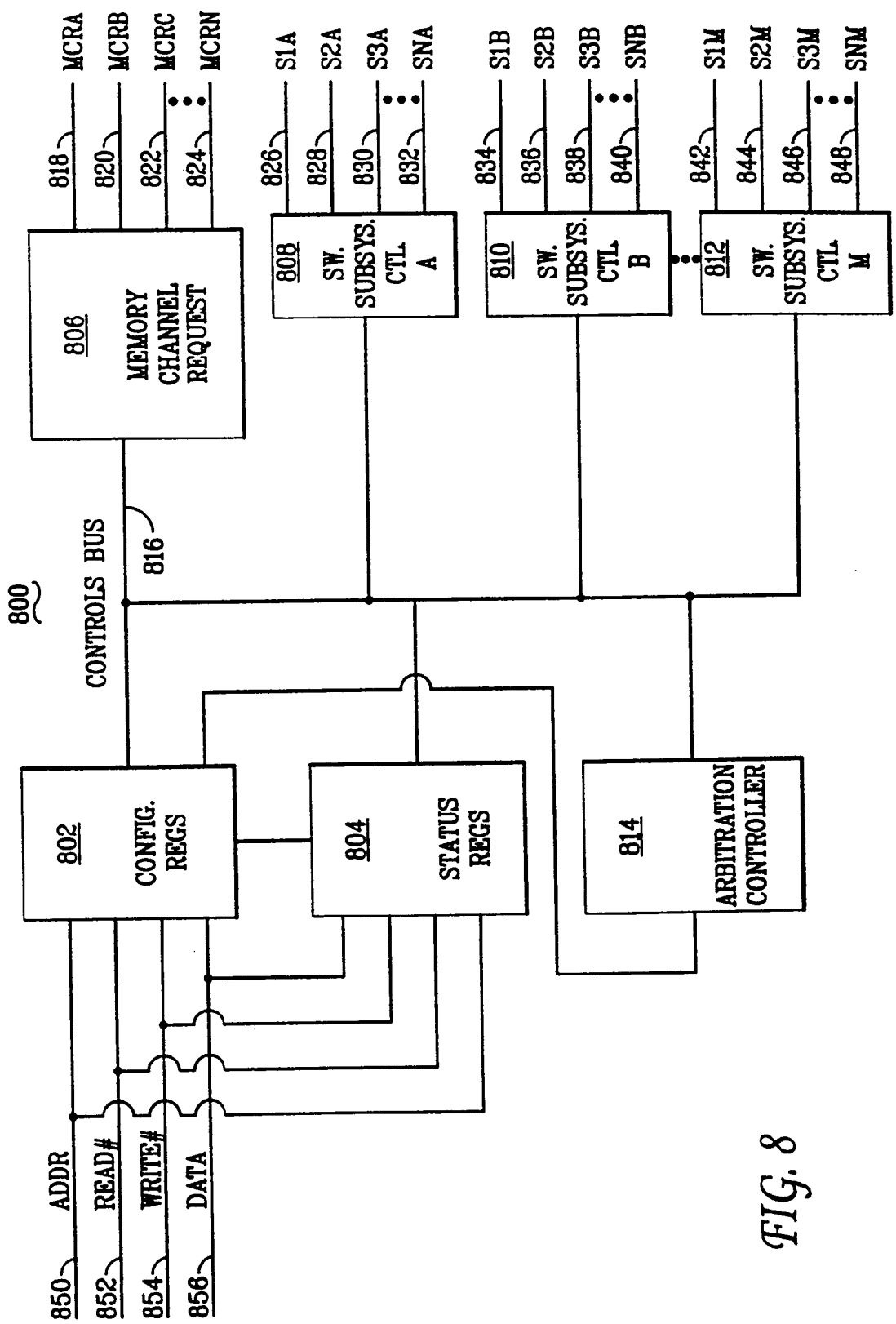
FIG. 8 is a diagram of an embodiment of an arbitration and data switch control architecture.

FIG. 8 shows a diagram of an embodiment of an arbitration and data switch control architecture 800. The configuration registers 802 and status registers 804 receive an address from input 850, a read from input 852, a write from input 854 and data from input 856 and output control information via controls bus 816 to the memory channel request unit 806 and the switch subsystem control units A 808, B 810, through M 812. The memory channel request unit 806 produce signals on control lines for each memory subsystems MCRA 818, MCRB 820, MCRC 822 through MCRN 824. Switch subsystem control unit A 808 produces signals on lines S1A 826, S2A 828, S3A 830, through SNA 832. Switch subsystem control unit B 810 produces signals on lines S1B 834, S2B 836, and S3B 838 through SNB 840. Switch subsystem control unit M 812 produces signals on lines S1M 842, S2M 844, and S3M 846 through SNM 848. Each control block has N number of control lines. For the 4×4 switch shown in FIG. 7, N and M are both 4.

The configuration registers 802 are set to reflect the nature of the subsystem controller. These characteristics can include the burst lengths, the latency tolerance and other addressing information. Configuration information is also required for the memory channel information. The status registers 804 track both pending requests from the switch subsystem controllers 808, 810 and 812 and the status of the memory channels 818, 820, 822 and 824.

Arbitration controller unit 814 receives memory requests from each of subsystems 808, 810 and 812. By using the configuration register 802 information as the status information, arbitration controller unit 814 acknowledges requests at appropriate times and signals memory channel request unit 806 and switch subsystem controllers 808, 810 and 812 to cycle through the memory requests.

Arbitration controller unit 814 ensures that the subsystems that have maximum latency tolerances are not compromised. Additionally, arbitration controller unit 814 maximizes the total bandwidth of the system to achieve the best performance. In some cases bursts are not broken up so that they can complete the use of a memory channel. In other cases, a single subsystem controller request is broken up and filled with multiple memory channel accesses.

Figure 9:
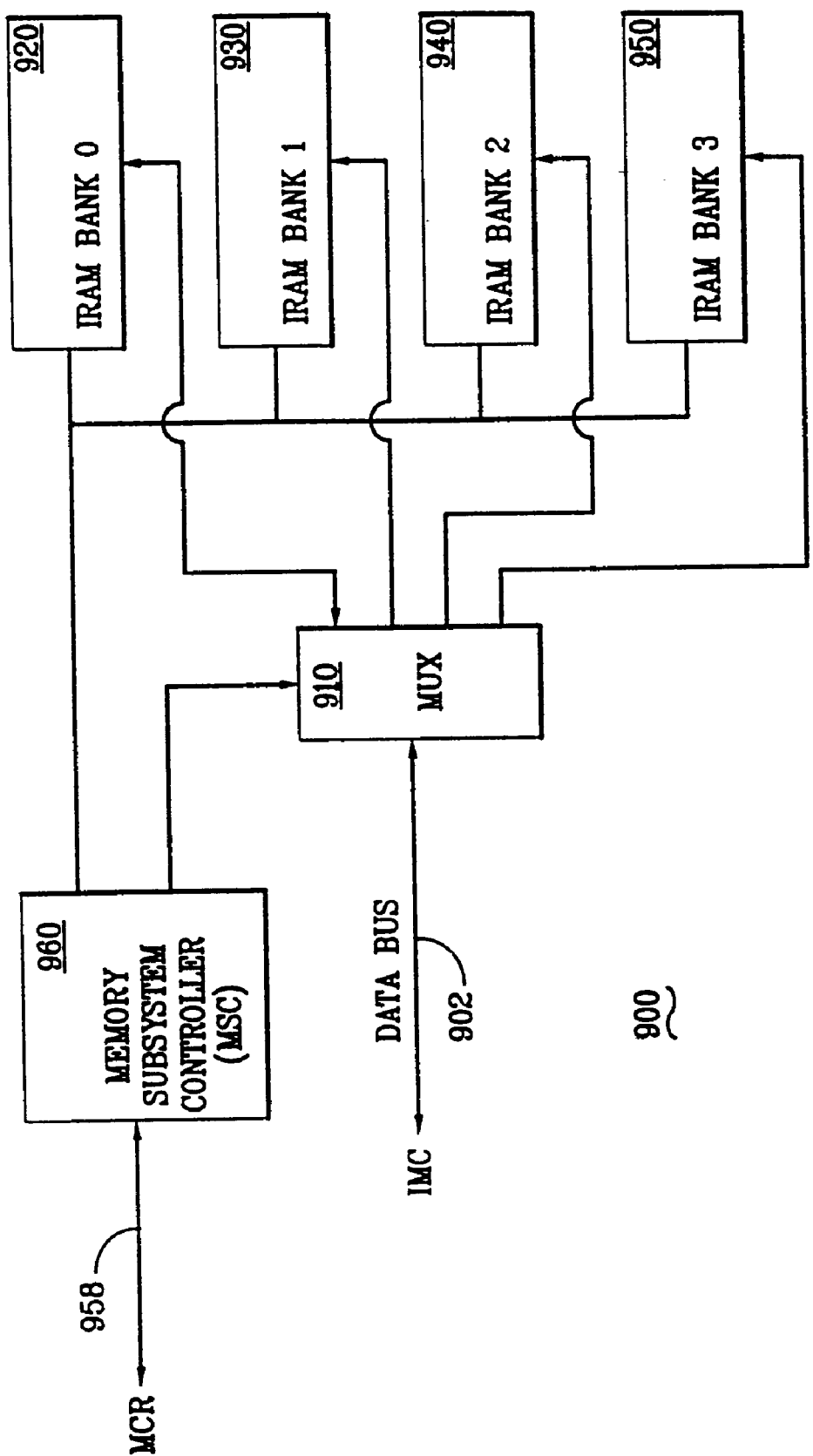
FIG. 9 is a diagram of an embodiment of a multi-bank IRAM subsystem.

FIG. 9 shows an embodiment of an internal memory subsystem 900 including a memory subsystem controller (MSC) 960, a data multiplexer (MUX) 910 and multiple banks of memory 920, 930, 940, and 950. The MSC 960 receives a memory channel request via line 958 when a subsystem controller requests a memory access within the address region associated with this memory subsystem. The MSC 960 controls the multiplexer 910 and the IRAM banks (920 through 950) to fulfill the data request. In the case of a read, the MSC 960 determines which IRAM bank contains the requested data and adjusts the MUX 910 control so that the IMC data bus 902 receives the data from the appropriate IRAM bank.

The MSC 960 must handle various size data requests. The IRAM bank width can be independent from the width of the IMC data path 902. The MSC 960 uses the MUX 910 logic to ensure that the appropriate data is transferred in the appropriate order to the IMC 902. This is an effective means for the MSC 960 to take advantage of the wide data paths available from IRAM banks 920 through 950. Multiple data transfers on the IMC 902 are accommodated by proportionally fewer IRAM bank accesses.

Additionally, the configuration of the memory bank allows fast sequential accesses. A bank of memory is defined as a row-column array of storage cells. Typically in DRAM, an entire row of the array is enabled with a single access. This allows any data within that row to be acessed quickly. If an access to a different row address within the same bank of IRAM occurs, a "pre-charge" penalty is incurred and the access is delayed. To avoid the likelihood of this occurrence, this example shows multiple banks employed in the memory subsystem.

While an internal memory subsystem can be designed as a singular bank, there are performance advantages to using multiple banks of memory. FIG. 9 shows four banks of IRAM 920 through 950 multiplexed by multiplexer 910 onto a single internal memory channel (IMC) 902, which improves the effective throughput of the IMC 902. For example, the IRAM banks (920 through 950) are interleaved so that sequential accesses occur to different banks. This is particularly helpful in the case that the IRAM bank is slower than the maximum IMC data rate.

In the case of DRAM, the IRAM banks (920 through 950) are interleaved on a bank basis both to take advantage of the page mode access within a bank and to hide the page miss penalty by changing banks when crossing a page boundary. The memory sequencer for the IRAM subsystem manages the banks to maximize bandwidth based on the memory access patterns. This involves either pre-charging the DRAM bank whenever a new bank is accessed or keeping a page active in each bank of memory.

The data bus 902 may be connected directly to a processing or IO subsystem data bus instead of going through an additional switch. This saves an additional level of switching. In order to allow the IRAM bank data to be shared in this type of configuration, the IRAM banks can also be connected to additional MUXs (not shown). Each additional MUX connects the IRAM banks to a separate processing or I/O subsystem data bus.

Figure 10:
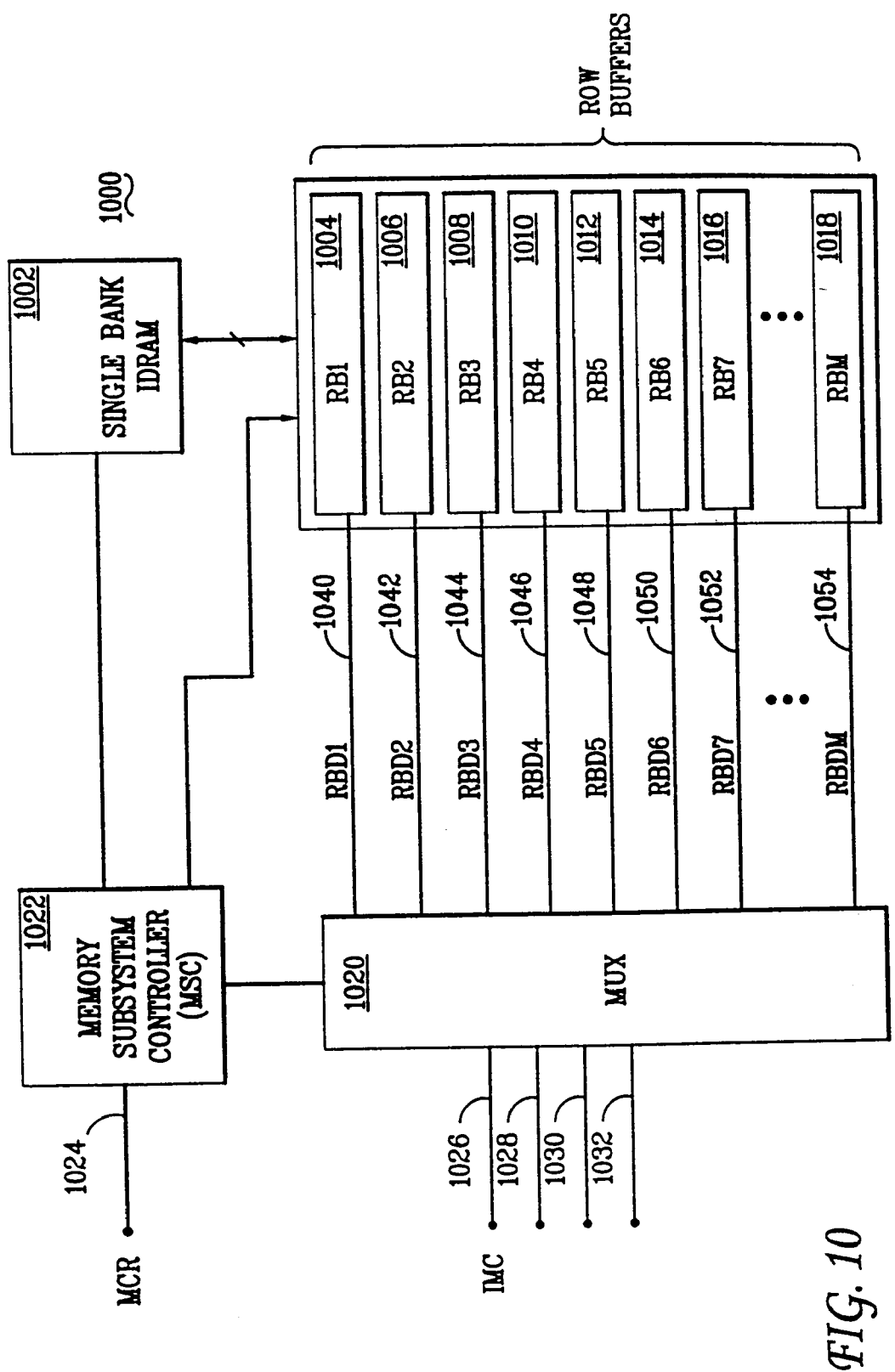
FIG. 10 is a diagram of an embodiment of an IRAM subsystem with a single bank IDRAM with row buffers.

FIG. 10 shows an embodiment of a memory subsystem 1000 including a memory subsystem controller (MSC) 1022, a single bank of IDRAM 1002, a set of bi-directional row buffers 1004 through 1018 and an optional MUX 1020. The MSC 1022 controls the interaction between the optional MUX 1020, row buffers 1004 through 1018 and IDRAM 1002. The request is fulfilled by the controller associated with IMC 1026–1032. The MSC 1022 receives a Memory Channel Request on line 1024 for data that correspond to the memory address range of the given internal memory subsystem 1000. The MSC 1022 controls the data transfers between the IDRAM bank 1002 and the row buffers 1004–1018 as well as controlling the transfers between the row buffers 1004 through 1018 and the optional MUX 1020 for selection of the row buffer data on line 1026 to the IMC.

When the MSC 1022 receives a new read request, it accesses the IDRAM array 1002 storing the requested data. The complete row of data from the IDRAM array is then transferred to a row buffer and then from the row buffer through optional MUX 1020 onto line 1026 to the IMC. In the case of a request for a series of data, the row buffer data is routed so that the request is filled in a burst manner on the IMC 1026. All of the row data remains in the row buffer.

The MSC 1022 fulfills subsequent data requests to different rows in the same manner without affecting the data stored in the other row buffers. These requests can be to the same or different IMCs. When a data read occurs to an address where the corresponding data already resides in the row buffer, the row buffer fulfills the read request directly without needing an additional IDRAM bank 1002 access. Having multiple rows of data in the row buffers for fast access achieves very high performance for typical access patterns to a memory subsystem.

MSC 1022 handles the control of writes to the memory subsystem in a similar manner. One skilled in the art of cache controller design is familiar with the following complications that result from having the IDRAM data temporarily cached in row buffers 1004 through 1018. If a data write occurs to a row of data that is already present in a row buffer, the write is simply done to the row buffer, and that row buffer is tagged as having the most recent copy of the data. This tag, referred to as "dirty," is significant as it requires that data be stored to the IDRAM array at some time and any subsequent reads to that row of data must be fulfilled with the most recent "dirty" data and not the "stale" data existing in the array.

There are further implementation tradeoffs when dirty data is written back to the array. Similarly, there is a need to design implementation tradeoffs for data writes to addresses not currently contained within a row buffer. The primary options are "allocation on write" where the complete row is read out of the array so that writes can occur to the row buffer. A simpler implementation simply "writes through" data writes to the IDRAM bank 1002 for locations that are not currently present in a row buffer.

An implementation detail for the allocation of row buffers corresponding to the memory locations is the tradeoff between performance and simplicity of implementation. In the simplest case, a row buffer is "direct mapped" to a fixed number of potential memory array rows. In the most flexible and most complex case, any row buffer corresponds to any IDRAM row and is said to be "fully associative." Intermediate complexity of design of a "set associative" mapping is possible where more than one row buffer corresponds to each fixed set of IDRAM rows.

Another complexity results from the set and fully associative mapping schemes where a row buffer replacement algorithm must be implemented. Since more than one row buffer can contain the data for a given row access, an algorithm is needed to choose which row buffer to replace for the new access. The preferred embodiment employs a type of "Least Recently Used" (LRU) replacement algorithm.

Designing a single bank of IDRAM 1002 may have some advantages as compared to a multi-bank design for area and power savings. To achieve greater performance from a single bank IDRAM 1002, temporary row buffers 1004 through 1018 are used to store memory reads and writes. These temporary row buffers 1004 through 1018 multi-port the memory bank.

Multi-porting is an extension of the dual-port approach that has long been used in specialty video RAMs (VRAMs). VRAMs include both a random access port and a serial access port. The serial access port uses data from a serial access memory (SAM) that is loaded in a single cycle from a RAM array. The VRAMs allow simultaneously acessing both the SAM data and the random data. VRAMs also allow data to be input serially into the SAM and then transferred in a single cycle into the main RAM.

The row buffers accomplish the same general function as a SAM does. The row buffers, like a SAM register, allow the contents an entire very wide row of RAM to be transferred in a single cycle into the row buffer. Unlike serial accesses to the SAM in a VRAM system, with the row buffers on-chip, the data path to the internal memory channel can be arbitrarily wide. Additionally, data steering logic is included in the data path so that data from the DRAM bank is transferred on the most optimal data lines of the IMC 1026.

Different subsystems use row buffers differently. For a function such as display refresh, the refresh controller makes a memory address request. The corresponding row of memory is transferred into a row buffer. The memory controller transfers the requested amount of data from the row buffer to the refresh controller. The memory transfer typically requires less data than the complete row buffer contents. When the refresh controller performs the next sequential request, the data is already in the row buffer ready to transfer.

The CPU subsystem in a non-graphics application performs a cache line fill from a memory address corresponding to an IDRAM bank. The IDRAM row is transferred to the row buffer and the cache line data is transferred through to the cache data channel. The row buffer is presumably larger than the cache-line size such that any additional cache line fills corresponding to the same row buffer address range are filled without needing to re-access the IDRAM bank.

Furthermore, multiple row buffers contain valid data at a given time. Accesses to different row buffers occur sequentially without losing the ability to return to active row buffers that contain valid data. Using the two examples above, a partial read of row buffer 1 (RB1) occurs on line 1026 to the IMC as part of screen refresh. Next the CPU performs a cache line fill over the IMC 1026 from RB2. The refresh then continues from RB1 as the next burst of transfers over the IMC 1026.

The IMC data buses 1026-1032 could be connected directly to a processing or I/O subsystem data bus instead of going through an additional switch. This saves an additional level of switching. Similarly, the row buffer data lines 1040–1054 could optionally be connected directly to a processing or subsystem data bus instead of going through the optional MUX 1020. Alternatively row buffer data lines 1040–1054 could be directly connected to the system data switch instead of going through the optional MUX 1020.

Figure 11:
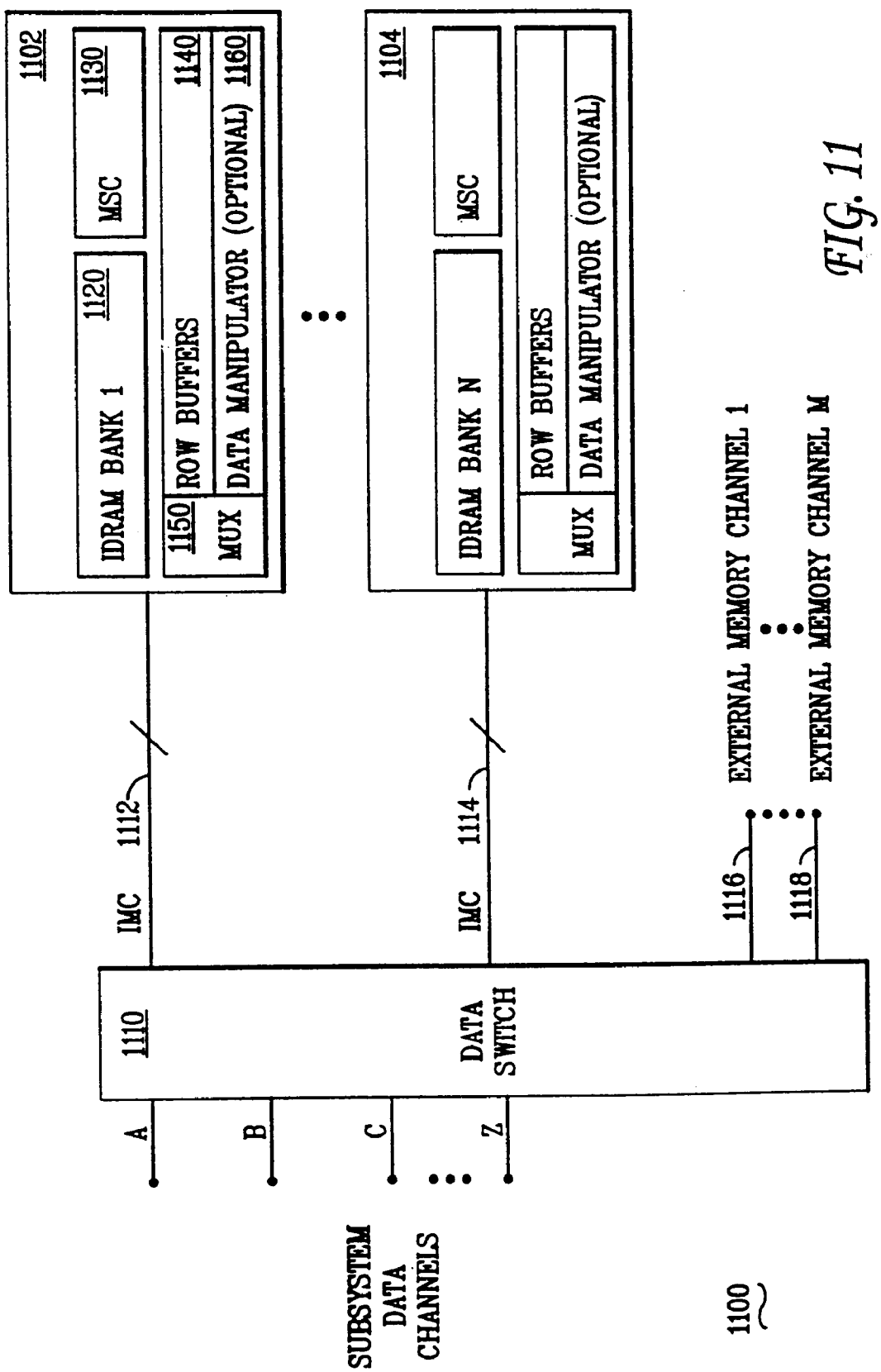
FIG. 11 is a diagram of an embodiment of a data switch with multiple IRAM subsystems each using multiple row buffers.

FIG. 11 shows a system 1100 including subsystem data channels A–Z connected by a data switch 1110 to internal memory channels IMC 1112–1114 with internal memory subsystems and external memory channels (EMC) 1116, 1118. Each IDRAM subsystem includes a bank of IDRAM 1120, a Memory Subsystem Controller (MSC) 1130, a set of row buffers 1140, a MUX 1150 for transferring the appropriate row buffer data onto the IMC 1112 and an optional Data Manipulator 1160 that is detailed below.

The improvement over the previous embodiments is the hybrid approach of combining multiple IDRAM banks each with a multitude of row buffers. As shown in FIG. 11, the internal memory subsystems 1102, 1104 each contain row buffers that correspond to a bank of IDRAM. The data switch 1110 has one or more channels into each IDRAM memory subsystem where the IMCs 1112, 1114 are multiplexed into row buffers. The MSC is responsible for controlling the transfers of the IDRAM data with the row buffers as well as coordinating the IMC channels 1112, 1114 to the appropriate row buffers. Alternatively, the data switch 1110 could MUX a row buffer from each IDRAM bank directly to a subsystem data channel.

Also shown within each IDRAM memory subsystem 1102, 1104 is an optional data manipulator (DM) e.g., 1160. The data manipulator 1160 contains storage elements that act as a second level of caching, as well as a simple Arithmetic Logic Unit (ALU), and is managed by the MSC 1130. The advantage of having the data manipulator 1160 within the IDRAM memory subsystem 1102 is the higher performance that is achieved. The data manipulator 1160 is the full width of the row buffers, or wider, without the need to increase the width of the IMC 1112, 1114 or the data switch 1110, and operates at data rates higher than the rates of data passing through the data switch 1110. This local optimization improves the performance for operations that occur within an IDRAM bank. Any operations that involve data in more than one IDRAM bank still need to utilize the data switch 1110 data paths.

The MSC 1130 can control the DM 1160 such that operations over the IMC 1112 that would be read-modify-write operations can be satisfied within the IDRAM memory subsystem with a simple write operation. U.S. Pat. No. 5,544,306, which is incorporated by reference, describes techniques for achieving this, where a Frame Buffer Dynamic Random Access Memory converts read-modify-write operations such as Z-Buffer compare and red-blue-green (RBG) alpha blending into a write-only operation.

Figure 12:
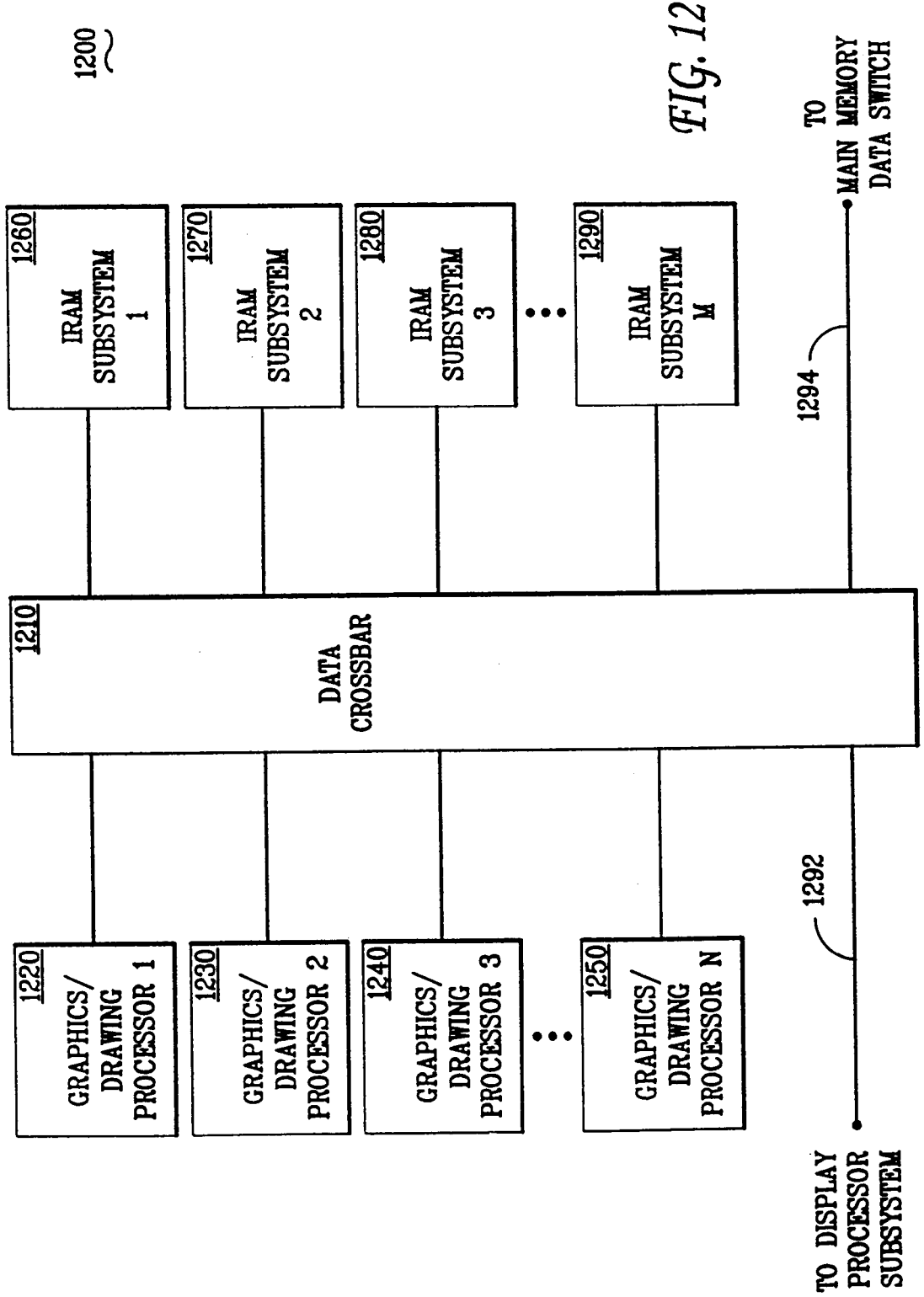
FIG. 12 is a diagram of an IRAM memory architecture applied more strictly to a graphics drawing and display subsystem independent of the main memory architecture.

The FIG. 12 IRAM memory architecture 1200 is applied to a graphics drawing and display subsystem independent of the main memory architecture. The multi-banked, row buffered or combined hybrid approach is combined with multiple graphics drawing engines and a local display controller to complete a very high performance graphics system. Each graphics/drawing processor (GDP) 1220, 1230, 1240 and 1250 has a path into the data switch 1210. Each IRAM subsystem (1260, 1270, 1280 and 1290) also has a path into the data switch. Additionally, the display processor subsystem and a path to main memory have connection points (1292 and 1294) into the data switch 1210. Each IDRAM subsystem can be a combination of multiple banks of memory, row buffers and data manipulators as described with reference to earlier figure.

The GDPs operate in parallel to manipulate image data for display. Each GDP may have local registers, buffers and cache memory. The GDPs can each operate on different IRAM subsystem data, or multiple GDPs may operate on data in one IRAM subsystem. The GDPs may each be responsible for the complete graphics pipeline of operations such as transform, lighting, set-up and rendering. Alternatively, each GDP may perform one of the stages of the graphics pipeline. Ideally the GDPs will be flexible enough that, depending on the particular application being performed, the system will operate in the most efficient configuration.

In the case where multiple GDPs are rendering data, the rendered data is not always in a regular structure representing a frame buffer. The Display Processor Subsystem (DPS) can be provided with the mapping information and reconstruct the display information from the various stored rendering information. The DPS reconstructs the image scan line-by-scan line so that the data can be sent out and displayed properly. The DPS also performs operations such as scaling and filtering that are better suited to being performed in this back end path than by the GDPs.

The path to the main memory data switch may be used by both the GDPs and the DPS. In the case of the GDPs, large textures or other elements requiring large amounts of storage can be read in by the GDPs and processed. In some cases the raw or processed data is cached in the IRAM subsystems or the data is simply used and only the resulting data stored locally. The display processor subsystem utilizes the path to main memory for constructing the output display. The output consists of data, from both the GDPs as well as from other elements, such as video data that are stored in the main system memory. The DPS constructs the output scan-line by scan-line from the data stored in either IRAM subsystems or main memory.

The architecture shown in FIG. 12 can be extended to system that is not related to graphics. Instead of multiple graphics/drawing processors, a system could include multiple compute engines each with their own registers, local memory or cache memory as needed. The IRAM subsystem architectures described earlier are equally applicable to improved performance for computationally complex algorithms performed across multiple compute engines. The compute engines can operate in parallel on different data elements for concurrency. Alternatively, the compute engines can operate in series each performing a stage of the overall processing. Applications where these approaches can be utilized include signal processing, compression, de-compression and communications.

An enhanced system with a common display memory and main memory preferably includes separate controls for each memory subsystem, an arbitration controller that takes the requests from multiple processor or peripheral subsystems, and a memory data path so that by a memory subsystem provides memory data to a processor or peripheral subsystem without preventing additional processor or peripheral subsystems from accessing other memory subsystems.

An enhanced system can include a partial drawing buffer where a graphics engine can write a portion of the display output data and transfer the portion of the display output data to a common memory subsystem for use during subsequent display updates after a display frame has been processed. An enhanced system preferably includes a complete drawing buffer where a graphics engine can store the complete display output data and transfer the display output data for subsequent display updates.

An enhanced system preferably includes a graphics controller to perform 3-D graphics functions, a texture cache to provide data for the graphics controller, and an order buffer where the graphics controller can fetch data.

For a 3-D graphics controller, one of the key aspects of 3-D processing is determining which objects, and subsequently which pixels of which objects, are visible for a given frame. Many objects of a given 3-D image may be occluded from a viewpoint by another object's pixels. To insure that the pixels from the proper object are in front and properly displayed, the 3-D system includes what is generally referred to as a Z-buffer or an order buffer. The order buffer is used to determine if the triangles or pixels of a new object are to be displayed for a given frame based on their position relative to the viewpoint. The earlier in a graphics pipeline that the ordering is performed, the less computation is needed to render pixels that will not ultimately be visible for a scene. However, it is sometimes just simpler to perform the complete rendering of a triangle and then on a pixel-by-pixel basis decide whether or not to update the display based on the value in the order buffer.

For systems with a single 3-D controller, accessing the order buffer is a key bandwidth consideration. Therefore, as with textures, it is advantageous to have a cache or buffer for the ordering information. For systems with multiple 3-D controllers, each 3-D controller may be permitted to operate asynchronously to balance the computation load and increase the system throughput. An order buffer that is accessible to each of the controllers allows asynchronous processing to occur and still be sure that the proper pixels from each object will end up in view.

Those skilled in the art will recognize that this invention can be implemented with additional subsystems connected in series or in parallel to the disclosed subsystems, depending on the application. Therefore, the present invention is limited only by the following claims.

What is claimed is:

1. A computer system comprising:
   a memory controller;
   a common display memory and main memory comprising at least one internal memory subsystem contained in the memory controller and at least one external memory subsystem outside of the memory controller;
   at least one multi-use memory channel operatively coupled to the at least one internal memory subsystem and the at least one external memory subsystem;
   a memory channel data switch coupled to the memory controller and configured to dynamically allocate the at least one multi-use memory channel; and
   a central processing unit (CPU) subsystem controller operably coupled to the memory channel data switch and the memory controller, the CPU configured to output control signals to the memory channel data switch and the memory controller.

2. The computer system of claim 1 further comprising a multiplexer configured to selectively couple at least one external memory subsystem to one of the at least one multi-use memory channels.

3. The computer system of claim 2 wherein one of the at least one internal memory subsystem and the at least one external memory subsystem is a display memory subsystem configured to be able to function as main system memory.

4. The computer system of claim 1 wherein one of the at least one internal memory subsystem and the at least one external memory subsystem is a display memory subsystem configured to be able to function as main system memory.

5. The computer system of claim 1 wherein at least one of the at least one internal memory subsystem and the at least one external memory subsystem includes a data manipulator containing a plurality of data storage elements.

6. The computer system of claim 1 further comprising a complete drawing buffer configured to permit a graphics engine to store display output data and transfer the display output data for subsequent display updates.

7. The computer system of claim 1 further comprising a computer display, a complete drawing buffer and a graphics engine, wherein the graphics engine is configured to be able to store output data in the drawing buffer for output to the computer display and to subsequently transfer the output data to the computer display for display updates.

8. A computer system comprising:
   a display;
   a memory controller;
   common display memory and main memory comprising at least one of an internal memory subsystem included within the memory controller and configured to cooperatively couple therewith, and at least one of an external memory subsystem outside of the memory controller and configured to cooperatively couple therewith;
   a plurality of memory channels operatively coupled to the common display memory and main memory, at least one of the plurality of memory channels configured as a multi-use memory channel;
   a memory channel data switch operably coupled to the memory controller and to the plurality of memory channels and configured to allocate selected ones of the plurality of memory channels between the at least one internal memory subsystem and the at least one external memory subsystem;
   a central processing unit (CPU) subsystem controller operably coupled to the memory channel data switch and the memory controller and configured to produce output signals to be applied to the memory channel data switch and memory controller;
   a graphics/drawing and display subsystem operably coupled to the CPU subsystem controller, the memory channel data switch and the memory controller, the graphics/drawing and display subsystem being configured to provide output signals to the memory channel data switch and the memory controller;
   an arbitration and control engine operably coupled to the CPU subsystem controller, the graphics/drawing and display subsystem, the arbitration and control engine being configured to provide output signals to the CPU subsystem controller and to the graphics/drawing and display subsystem; and
   a peripheral bus controller operably coupled to the memory channel data switch, the memory controller and the arbitration and control engine and configured to provide output signals to the memory channel data switch, the memory controller and the arbitration and control engine.

9. The computer system of claim 8 wherein at least one of the at least one internal memory subsystem and the at least one external memory subsystem includes DRAM memory.

10. The computer system of claim 9 wherein at least one of the at least one internal memory subsystem and the at least one external memory subsystem comprises a data manipulator containing a plurality of storage elements.

11. The computer system of claim 8 wherein at least one of the at least one internal memory subsystem and the at least one external memory subsystem comprises a data manipulator containing a plurality of storage elements.

12. The computer system of claim 8 further comprising a computer display, a complete drawing buffer and a graphics engine, wherein the graphics engine can store output data in the drawing buffer for output to the computer display and subsequently transfer the output data to the computer display for display updates.

* * * * *